(12) United States Patent
Breard et al.

(10) Patent No.: US 10,471,643 B2
(45) Date of Patent: Nov. 12, 2019

(54) MOLD FITTED WITH AN INTERCHANGEABLE COUNTER STRETCH MOLDING ROD

(71) Applicant: SIDEL PARTICIPATIONS, Octeville-sur-Mer (FR)

(72) Inventors: Matthieu Breard, Octeville-sur-Mer (FR); Marc Leroux, Octeville-sur-Mer (FR); Arnaud Barbey, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/773,912

(22) PCT Filed: Oct. 17, 2016

(86) PCT No.: PCT/FR2016/052676
§ 371 (c)(1),
(2) Date: May 4, 2018

(87) PCT Pub. No.: WO2017/077209
PCT Pub. Date: May 11, 2017

(65) Prior Publication Data
US 2018/0319068 A1    Nov. 8, 2018

(30) Foreign Application Priority Data
Nov. 6, 2015   (FR) ..................................... 15 60659

(51) Int. Cl.
B29C 49/12       (2006.01)
B29C 49/14       (2006.01)
(Continued)

(52) U.S. Cl.
CPC .............. B29C 49/12 (2013.01); B29C 49/06 (2013.01); B29C 49/14 (2013.01); B29C 49/48 (2013.01);
(Continued)

(58) Field of Classification Search
CPC . B29C 49/14; B29C 2049/4892; B29C 49/48; B29C 49/12; B29C 2049/283; B29C 49/4268
See application file for complete search history.

(56) References Cited

U.S. PATENT DOCUMENTS 4,414,175 A     11/1983   Rainville
4,457,688 A *   7/1984    Calvert ................... B29C 49/12
                                                                     264/531
(Continued)

FOREIGN PATENT DOCUMENTS

DE     10 2011 015 666 A1    10/2012
WO     2013/063461 A1        5/2013

OTHER PUBLICATIONS

International Search Report, dated Jan. 20, 2017, from corresponding PCT application No. PCT/FR2016/052676.

*Primary Examiner* — Robert B Davis
(74) *Attorney, Agent, or Firm* — Young & Thompson

(57) ABSTRACT

Disclosed is a mold for manufacturing a container from a preform, the mold including: a side wall, a mold bottom having a through-passage in the center thereof, a cylinder including a body and a counter stretch molding rod that is mounted so as to be slidable relative to the body between an extended position in which the counter stretch molding rod projects relative to the mold bottom and a retracted position, a stand on which the mold bottom is mounted, this stand including a lower stage, an upper stage and a spacer detach-
(Continued)

ably inserted between the upper stage and the lower stage and defining the cavity in part.

20 Claims, 5 Drawing Sheets

(51) Int. Cl.
*B29C 49/48* (2006.01)
*B29C 49/06* (2006.01)
*B29L 31/00* (2006.01)
*B29K 67/00* (2006.01)

(52) U.S. Cl.
CPC ............... *B29C 2049/4892* (2013.01); *B29K 2067/003* (2013.01); *B29L 2031/712* (2013.01); *B29L 2031/7158* (2013.01)

(56) References Cited

U.S. PATENT DOCUMENTS

| | | | | |
|---|---|---|---|---|
| 4,547,333 | A * | 10/1985 | Takada | B29C 49/12 264/531 |
| 5,681,520 | A * | 10/1997 | Koda | B29C 49/16 264/520 |
| 9,802,375 | B2 | 10/2017 | Lisch et al. | |
| 2004/0070119 | A1* | 4/2004 | Fibbia | B29C 49/12 264/531 |
| 2010/0181704 | A1* | 7/2010 | Kelley | B29C 49/4802 264/312 |
| 2010/0209634 | A1 | 8/2010 | Kim et al. | |
| 2013/0106028 | A1 | 5/2013 | Lisch et al. | |
| 2014/0374965 | A1 | 12/2014 | Tanaka et al. | |
| 2017/0072617 | A1* | 3/2017 | Maki | B29C 49/28 |
| 2018/0029321 | A1 | 2/2018 | Lisch et al. | |

* cited by examiner

MOLD FITTED WITH AN INTERCHANGEABLE COUNTER STRETCH MOLDING ROD

The invention relates to the manufacturing of containers, such as bottles or pots, obtained by shaping, and more specifically by blow molding or stretch blow molding, starting from preforms made of thermoplastic material (in particular PET—polyethylene terephthalate).

A preform ordinarily has a cylindrical drum that ends in—at a lower end—a hemispherical bottom, an open neck that extends from an upper end of the drum, and a collar that separates the drum from the neck. The neck and the collar have their final shape that they preserve on the container that is formed from the preform. A preform is generally injection-molded, and a projecting injection pellet in general stays on the bottom of the preform.

To manufacture a container according to the blow-molding technique, the first step is to heat a preform to a temperature that is higher than the glass transition temperature of the constituent material of the blank. The preform is then inserted into a mold, and then the shaping of the container is carried out by injecting a fluid (such as air) under high pressure (generally higher than 20 bar) into the preform.

The technique of the stretch blow molding consists, in addition to the blow molding, in stretching the preform by means of a sliding rod, so as to minimize the offsetting of the container and to make the distribution of the material as uniform as possible.

A container comprises a body, a neck that extends from an upper end of the body, and a bottom that extends from a lower end of the body, opposite to the neck. The bottom of the container defines a seat by which the container can rest on a flat surface (such as a table).

The mold comprises a wall that has an inner surface that defines an at least partial impression of the body of the container. This wall is provided, at a lower end, with an opening, and the mold also comprises a mold bottom that is embedded in the opening and that has an upper surface that defines an at least partial impression of the bottom of the container.

A difficulty that is frequently encountered during the blow molding of a container is the offsetting of the preform in relation to the mold. This phenomenon occurs in particular when the preform has defects (for example, density defects due to a poor material distribution during injection) or when the heating has not been uniform along the periphery of the preform. It is easy to confirm that the injection pellet that is initially present on the preform and that is not (or is slightly) deformed during the blow molding is offset from the center of the bottom, a sign that an offsetting of the preform has occurred during the blow molding.

The stretching rod can help to keep the preform in the axis during the shaping of the container, but it cannot completely compensate for the shape or heating defects and does not make it possible to avoid all offsetting. Likewise, if the upper surface of the bottom is provided in its center with a hollow in which the injection pellet is intended to be housed, this hollow can only keep the preform centered at the end of the stretching, assuming that no offsetting has occurred during the former.

One approach has been proposed for keeping the preform in the axis of the mold during the shaping. This approach, described in the U.S. patent application US 2013/063461 (AMCOR), consists in equipping the mold with a cylinder that is provided with a rod (called counter-stretching rod), which passes through the mold bottom and against which the bottom of the preform is supported during the stretching. For this purpose, the counter-stretching rod is mounted to slide in relation to the mold bottom between a deployed position (that the rod occupies at the beginning of the shaping) and a retracted position corresponding to the end of the shaping.

This structure certainly constitutes an advance over the previous structures, but in any case, it has a major defect: it is appropriate for only a single size of preform. However, it may be, during production, that the preform model is changed without the container model being changed—and therefore without the mold being changed. In particular, it may be that the length of the preform varies. If the new preform is longer than the previous one, then the counter-stretching rod is too long and runs the risk, in the deployed position, of penetrating the bottom of the preform. In contrast, if the new preform is shorter than the previous one, then the counter-stretching rod is too short and no longer comes into contact with the bottom of the preform in the deployed position, which makes it incapable of performing its function of holding the preform in the axis of the mold.

One objective is consequently to propose a mold that can be easily, simply and quickly adapted to preforms of various lengths while ensuring that the former are held in the axis of the mold during the shaping.

For this purpose, a mold is proposed for the manufacturing, starting from a preform that is made of plastic material, of a container that comprises a body and a bottom, with this mold comprising:

A side wall that has an inner surface that defines an at least partial impression of the body of the container and that has an opening at a lower end;

A mold bottom that is fitted into the opening and that has an upper surface that defines an at least partial impression of the bottom of the container, with the mold bottom being penetrated at its center by a passage;

A cylinder that comprises a cylinder body and a counter-stretching rod that is mounted to slide in relation to the cylinder body through the passage, between a deployed position in which a free end of the counter-stretching rod projects in relation to the mold bottom and a retracted position in which the free end of the counter-stretching rod is in the vicinity of the mold bottom;

with this mold being characterized in that it also comprises a stand on which the mold bottom is mounted, with this stand comprising a lower stage and an upper stage mounted on the lower stage, with the stand defining on the inside a housing in which the cylinder body is mounted, with the stand also comprising a crosspiece that is inserted in a removable manner between the upper stage and the lower stage and that defines, in part, the housing.

This structure makes it possible to replace the cylinder by another cylinder of a different size, to make it possible to blow mold the same container with a preform of a different size.

Various additional characteristics can be provided, by themselves or in combination:

The crosspiece is provided with a through hole that forms in part the housing.

The lower stage of the stand is provided with a lower bore that forms a part of the housing for the cylinder body.

The lower stage of the stand is penetrated by a fluid feed pipe, which empties into the lower bore.

The upper stage of the stand is provided with an upper bore that forms a part of the housing for the cylinder body.

The upper stage is penetrated by a hole for exposure to the air that empties into the upper bore.

The cylinder body has an upper cross-section with a diameter that is smaller than that of the upper bore, with this upper cross-section being penetrated by at least one air vent that empties into the upper bore.

The upper stage of the stand comprises a support on which the mold bottom is mounted, and a base on which the support is mounted.

The base carries a centering ring that has a groove into which jaws are fitted that are integral with the side wall.

Other objects and advantages of the invention will become evident from the description of an embodiment, given below with reference to the accompanying drawings in which.

Figure 1:
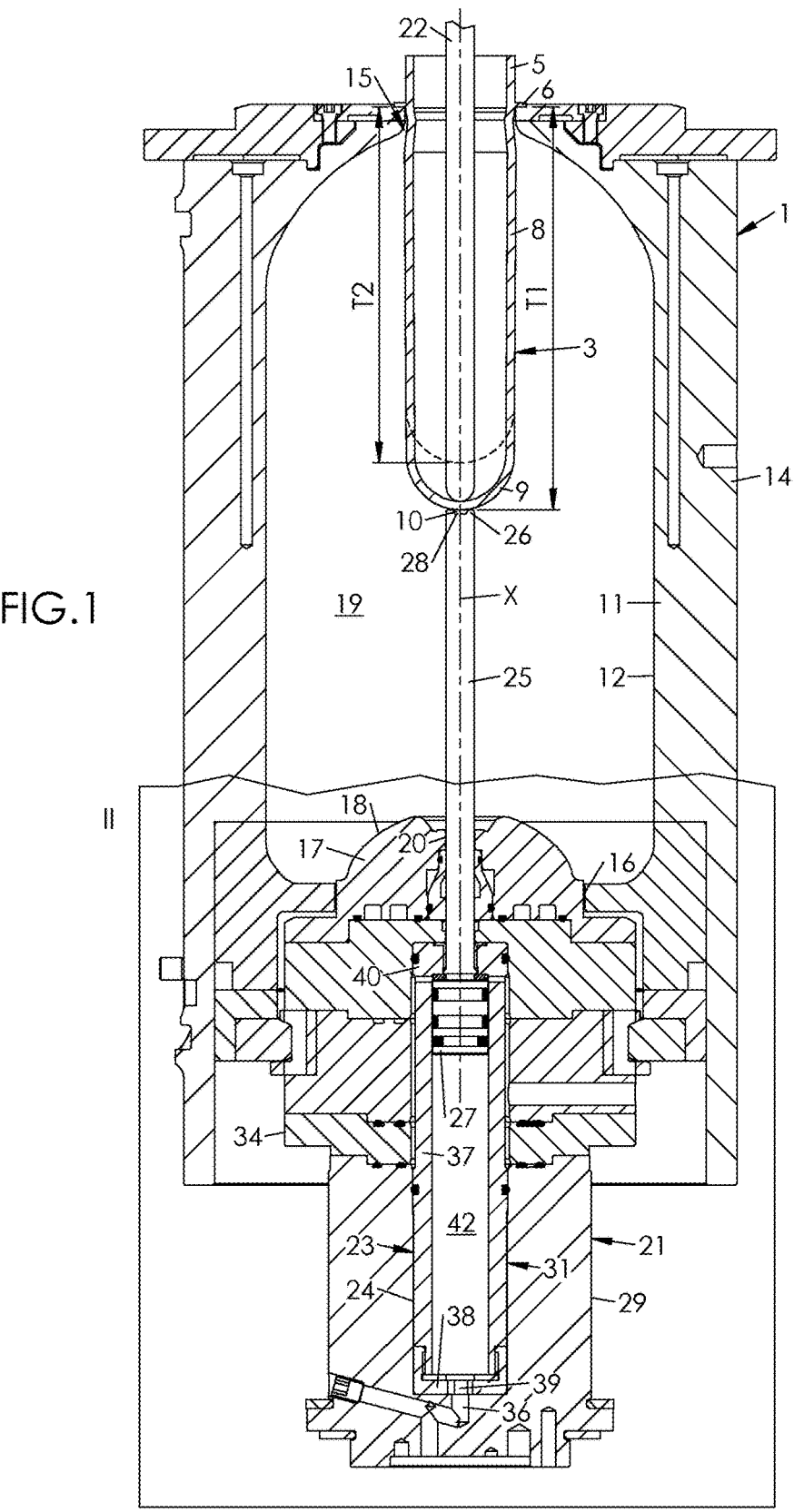
FIG. 1 is a cutaway view of a mold that is equipped with a cylinder that has a counter-stretching rod, shown in the deployed position of the former.

FIG. 1 shows a mold 1 for the manufacturing of a container 2 by shaping (i.e., by blow molding or by stretch blow molding), starting from a preform 3 that is made of plastic material such as PET.

Figure 4:
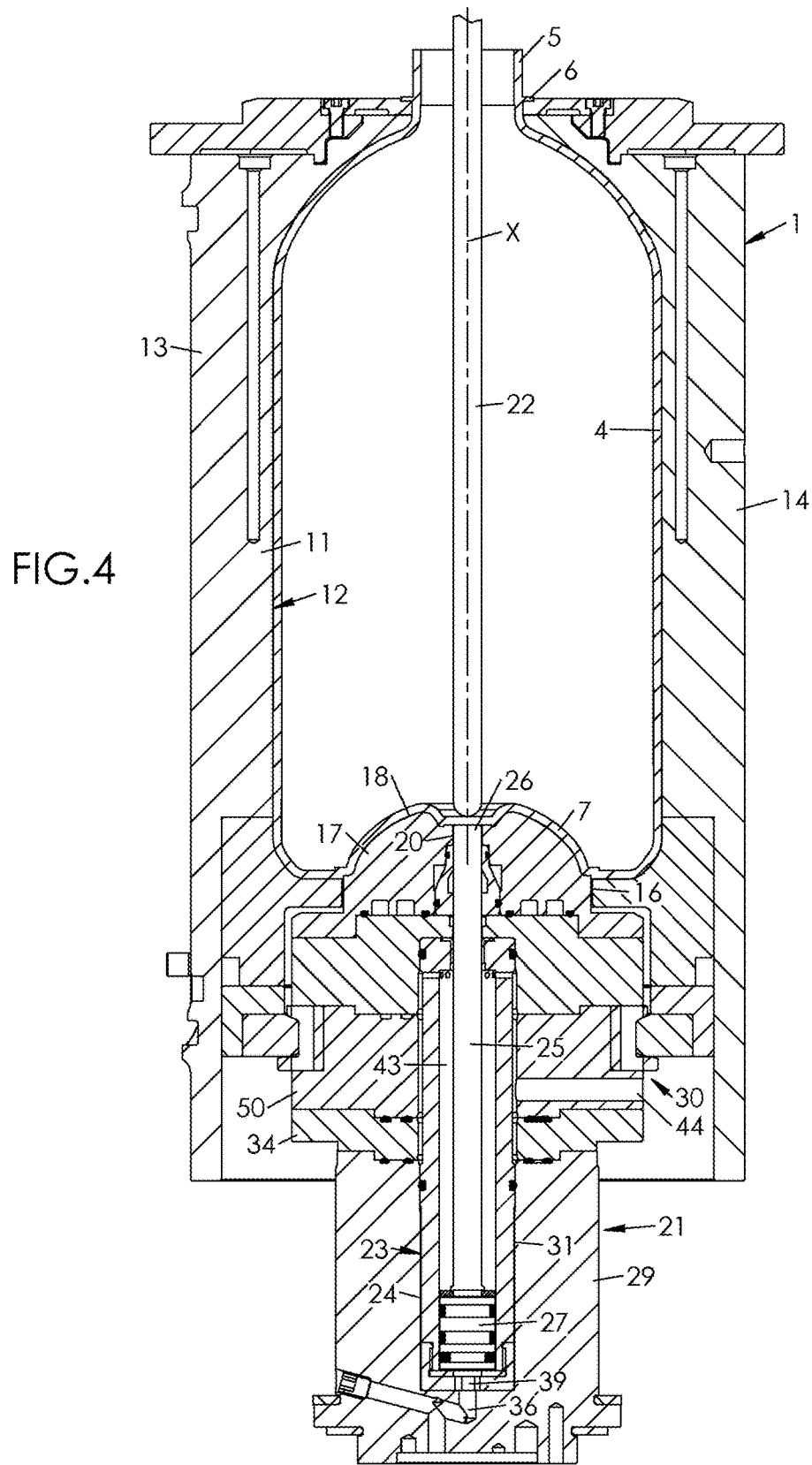
FIG. 4 is a view that is similar to FIG. 3, showing the mold at the end of the shaping, with the counter-stretching rod being in its retracted position.

The container 2 that is to be shaped, illustrated in FIG. 4, comprises a body 4 that extends along a central axis X, an open neck 5 that extends the body 4 at an upper end of the former, a collar 6 that separates the neck from the body, and a bottom 7 that closes the body 4 at a lower end of the former, opposite to the neck 5. It is by the neck 5 that the container 2 is filled after having been shaped. As usual, the neck 5 can be threaded to make it possible to screw on a cap that will close the container 2 in an airtight manner.

The preform 3 comprises a body 8 in the shape of a cylindrical drum, whose material is intended to form the body 4 of the container, a hemispherical bottom 9 whose material is intended to form the bottom 7 of the container 2, as well as, opposite the bottom 9, the above-mentioned neck 5 and the collar 6 that already have their final shape. Under the bottom 9 of the preform 3, a pellet 10 or projecting injection extension can appear that corresponds to the residue of material present in the injection channel of the mold into which the preform 3 is injected. The preform 3 could be trimmed to remove the pellet 10, but the former can advantageously be employed to improve the shaping of the container 2, as will be explained below.

The body 4 and the bottom 9 of the preform 3 undergo a heat treatment (i.e., heating), before the former is inserted into the mold 1 to be transformed there into a container, by injection of a forming fluid.

As illustrated in FIG. 1, the mold 1 comprises, in the first place, a side wall 11 that has an inner surface 12 that defines an at least partial impression of the body 4 of the container 2. In a conventional manner, the side wall 11 can be subdivided into two half-molds 13, 14, each defining a half-impression of the body 4 of the container 2, movable in relation to one another, for example by being articulated in relation to one another around a vertical hinge. At an upper end, the side wall 11 has an upper opening 15 through which the preform 3 is suspended, its collar 6 resting against an outer upper face of the mold 1. At a lower end, the side wall 11 has a lower opening 16 that, when said wall 11 is subdivided into two half-molds 13, 14, is defined jointly by the former. The mold 1 extends along an axis that passes through the geometric centers of the openings 15, 16. This axis is merged with the axis X of the container 2 that is present in the mold (FIG. 4). Below, the axis X consequently refers equally to the axis of the container 2 or the axis of the mold 1.

In the second place, the mold 1 comprises a mold bottom 17 that has an upper surface 18 that defines an at least partial impression of the bottom 7 of the container 2. The mold bottom 17 is fitted into the lower opening 16 to delimit, with the inner surface 12 of the side wall 11, a cavity 19 bearing the impression of the container 2 (except for the neck 5, which is already present on the preform). The mold bottom 17 is penetrated, at its center, by a passage 20 (in the form of a through perforation) whose function will appear below.

In the third place, the mold 1 comprises a stand 21 on which the mold bottom 17 is mounted. This stand 21 is mounted in translation along the axis X of the mold 1 between an upper position (shown in the figures), in which the mold bottom 17 blocks the lower opening 16 to supplement the impression of the container 2, and a lower position (not shown), in which the mold bottom 17 is separated from the lower opening 16 (with the half-molds 13, 14 themselves being separated from one another) to make it possible to demold the container 2. For this purpose, the stand 21 is mounted on a cylinder that, for the sake of simplicity, is not shown in the figures.

According to a preferred embodiment, the container 2 is formed by stretch blow molding. The blow molding is carried out by injection, into the preform 3, of a pressurized fluid (in particular air). The stretching is done by means of a stretching rod 22 that is mounted to slide along the axis X of the mold 1 between an upper position (not shown) into which the stretching rod 22 makes it possible to insert the preform 3 and to remove the container 2, and a lower position in which the stretching rod 22 extends into the cavity 19 in the vicinity of the mold bottom 17 in such a way that the bottom 7 of the container is clamped between the stretching rod 22 and the mold bottom 17. In theory, the stretching rod 22 is sufficient to keep the preform 3 centered in relation to the mold 1 during the blow molding. In practice, the stretching rod 22 cannot prevent the offsetting of the preform 3 under certain conditions, in particular when the former has homogeneity defects in its temperature, or shape defects (even minor ones).

This is why the mold 1 is equipped, in the third place, with a cylinder 23 that comprises a cylinder body 24 that is mounted in the stand 21 and a counter-stretching rod 25 that extends through the passage 20, with this counter-stretching rod 25 having a free upper end 26 and a lower end that is shaped like a piston 27 that is housed in the cylinder body 24.

By its piston 27, the rod 25 is mounted to slide in relation to the cylinder body 24 between:

A deployed position, illustrated in FIG. 1, in which the free end 26 of the counter-stretching rod 25 projects in relation to the mold bottom 17 in the cavity 19 to come into contact with the bottom 9 of the preform 3 when the former is placed in the mold 1 before being blow molded (and/or stretched), and A retracted position, illustrated in FIG. 4, in which the free end 26 of the counter-stretching rod 25 is in the vicinity of the mold bottom 17 to make it possible for the bottom 9 of the preform 3 to be applied against the upper surface 18 of the mold bottom 17 and thus to take on the impression of the bottom 7 of the container 2.

More specifically, in the retracted position, the free end 26 of the counter-stretching rod 25 will be flush with the upper surface 18 of the mold bottom 17 to supplement the impression of the bottom 7 of the container 2.

The counter-stretching rod 25 has as its function to keep the preform 3 centered in relation to the mold 1 during the shaping. The counter-stretching rod 25 can be used by itself when the container 2 is simply blow molded (in the absence of a stretching rod), or, preferably, in combination with the stretching rod 22 when the container 2 is stretch blow molded.

The upper end 26 of the counter-stretching rod 25 is preferably provided with a recessed reserve 28 that is designed to collect the injection pellet 10 from the preform 3 as soon as the counter-stretching rod 25 is in the deployed position.

As can be seen in the figures, the stand 21 is staged: it comprises a lower stage 29 and an upper stage 30 mounted in a removable manner on the lower stage 29.

On the inside, the stand 21 defines a housing 31 (advantageously cylindrical in shape) in which the cylinder body 24 is mounted in a removable manner. This housing 31 is formed in part in the lower stage 29 and in part in the upper stage 30.

Figure 2:
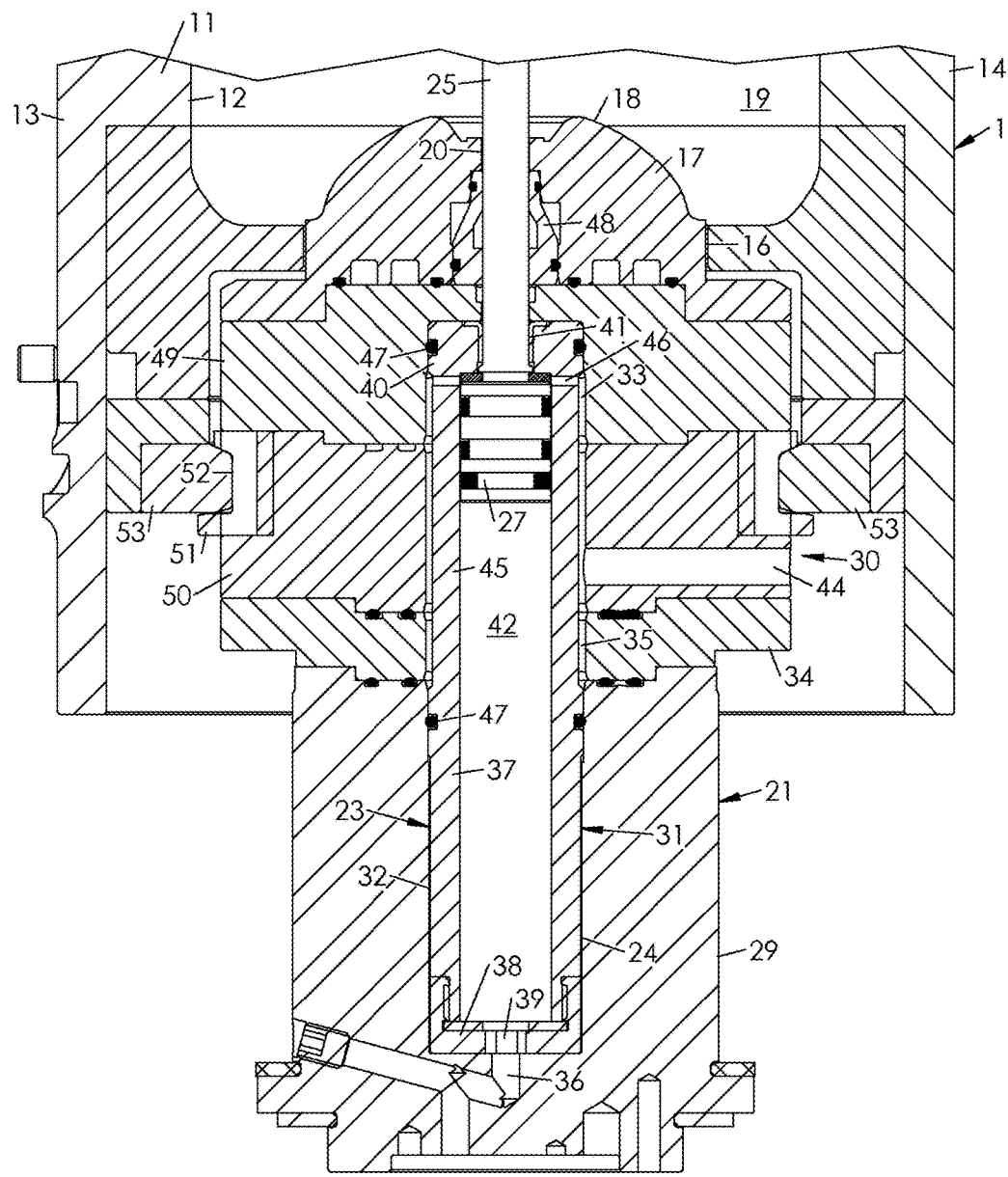
FIG. 2 is a detail view, on a larger scale, of the mold of FIG. 1, according to the inset II.
Figure 5:
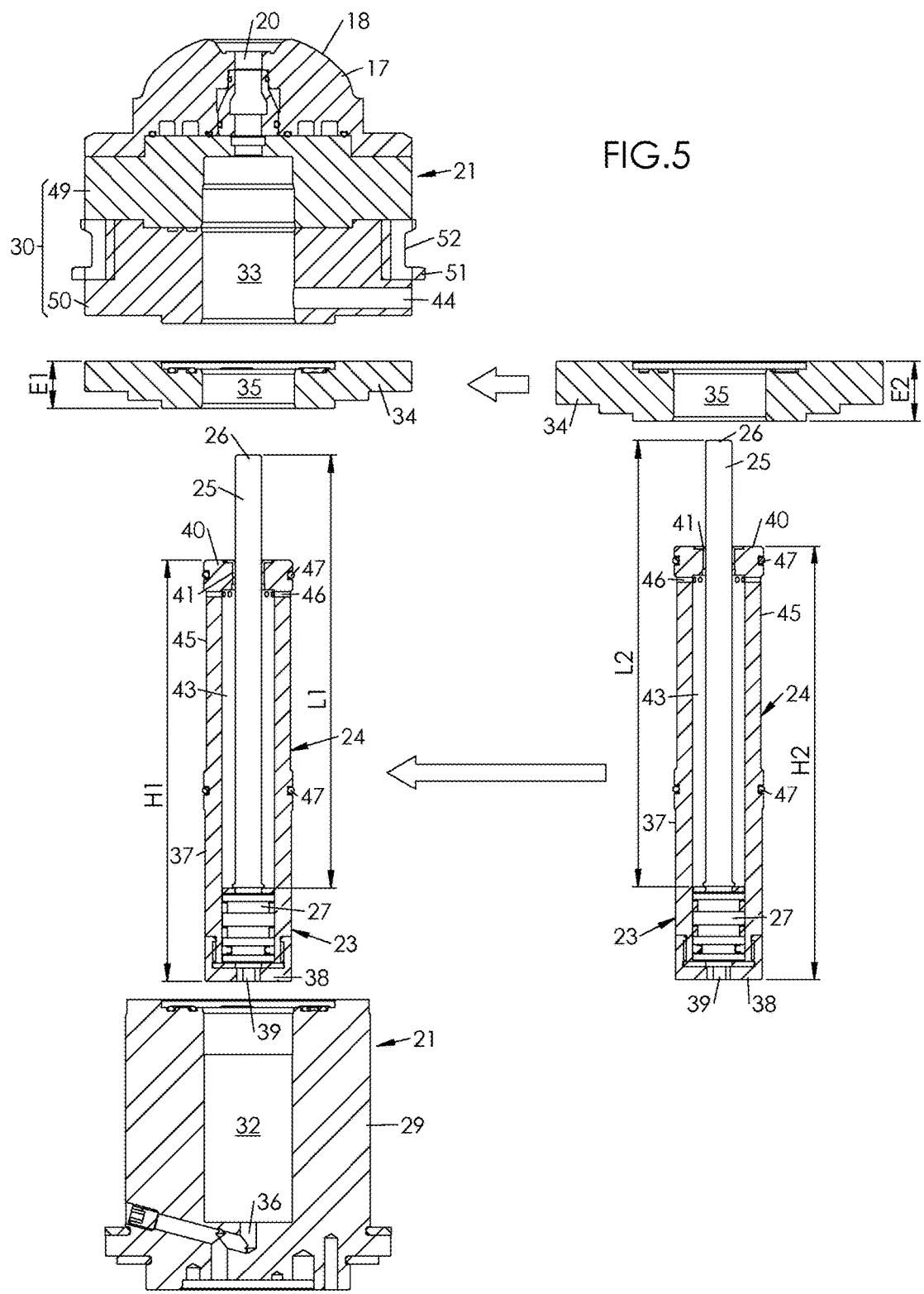
FIG. 5 is an exploded cutaway view, showing, on the left, the mold bottom, its stand and the cylinder, and illustrating the replacement of the cylinder and the crosspiece by a cylinder and a crosspiece of greater length (or thickness).

More specifically, and as FIGS. 2 and 5 clearly show, the lower stage 29 is provided with a lower bore 32 that forms a part of the housing 31. Likewise, the upper stage 30 of the stand 21 is provided with an upper bore 33 that forms another part of the housing 31.

As FIGS. 2 and 5 also show, the stand 21 comprises a crosspiece 34 that is inserted in a removable manner between the lower stage 29 and the upper stage 30 and that supplements the housing 31.

The crosspiece 34 comes in the form of a washer, for example; it is provided with a central through hole 35 that forms in part the housing 31. When the crosspiece 34 is integral (by being attached, for example, by screwing) with the lower stage 29 and the upper stage 30, the central hole 35 extends in a coaxial manner to the lower bore 32 and the upper bore 33 to supplement the housing 31.

To adapt the cylinder 23 to a preform 3 of a different size would take more than replacing the counter-stretching rod 25. If the counter-stretching rod 25 is shortened (to adapt it to a longer preform 3), it will, traveling the same path, return to the mold bottom 17 in the retracted position and will create a hole there that the material of the bottom 9 of the preform 3 will clog at the end of the blow molding, which will form on the bottom 7 of the container a projection that is unattractive and is likely to reduce the mechanical strength of the former.

In contrast, if the counter-stretching rod 25 is lengthened (to adapt it to a shorter preform 3), it will go beyond the mold bottom 17 in the retracted position and will form in the bottom 7 of the container a reinforcement that is also likely to reduce the mechanical strength of the former.

The fact that the crosspiece 34 and the cylinder 23 are both removable makes it possible to replace both of them respectively by a crosspiece 34 and a cylinder 23 of different sizes, as illustrated in FIG. 5.

On the left in FIG. 5, there is shown, in cross-section, the exploded stand 21 that comprises a crosspiece 34 that has a primary thickness denoted E1 and a cylinder 23 whose body 24 has a primary height (measured axially) denoted H1 and whose counter-stretching rod 25 has a primary length (also measured axially) denoted L1. On the right in FIG. 5, there is shown a crosspiece 34 that has a secondary thickness denoted E2, greater than the primary thickness E1, and a cylinder 23 whose body 24 has a secondary height denoted H2, greater than the primary height H1, and whose counter-stretching rod 25 has a secondary length denoted L2, greater than the primary length L1.

H2 and L1 are such that:

$$H2=H1+E2-E1$$

$$L2=L1+E2-E1$$

As illustrated by the arrows of FIG. 5, the crosspiece 34 with primary thickness E1, the cylinder 23 whose body 24 has height H1, and the counter-stretching rod 25 of length L1, adapted to a preform 3 of size T1 (corresponding to the length that is measured axially under the collar 6), are replaced here respectively by the crosspiece 34 with thickness E2, by the cylinder 23 whose body 24 has height H2, and by the counter-stretching rod 25 of length L2, to adapt the mold 1 to a preform model of size T2, where:

$$T2=T1+E2-E1$$

In this way, it is not necessary to replace the stand 21 completely.

The replacement of the crosspiece 34 and the cylinder 23 can be carried out in a simple and fast manner. It is enough to detach the crosspiece 34 (in particular by unscrewing it when it is attached by screwing) and to remove the cylinder 23 from its housing 31, and then to reattach the new cylinder 23 in the housing 31 and to reattach the corresponding crosspiece 34 between the lower stage 29 and the upper stage 30.

The cylinder 23 can be attached in the housing 31, for example by screwing. However, such an attachment is not necessary, the cylinder body 24 able to be simply press-fitted into the housing 31, as in the example illustrated in the figures.

According to a preferred embodiment that is illustrated in FIG. 2, the lower stage 29 of the stand 21 is penetrated by a fluid feed pipe 36, which empties into the lower bore 32.

The cylinder body 24 comprises a cylindrical jacket 37 that is delimited, on a lower end, by a lower wall 38 that is penetrated by a hole 39 that extends to the right of the feed pipe 36 and, on an upper end, by an upper wall 40 that is penetrated by a hole 41 for the passage of the counter-stretching rod 25.

The piston 27, the jacket 37, and the lower wall 38 jointly delimit a lower chamber 42 for the fluid that comes from the feed pipe 36.

The piston 27, the jacket 37, and the upper wall 40 jointly delimit an upper chamber 43 that communicates with the atmosphere. For this purpose, in the example that is illustrated in the drawings:

The upper stage 30 is penetrated radially by a hole 44 for exposure to the air that empties into the upper bore 33;

The jacket 37 has an upper cross-section 45 with an outer diameter that is smaller than the inner diameter of the upper bore 33, with this upper cross-section being penetrated (radially) by at least one air vent 46 that empties into the upper bore 33.

In the illustrated example, the cylinder body 24 comprises a peripheral series of air vents 46 that are positioned radially in the jacket 37 at its junction with the upper wall 40, in such a way as to make it possible to evacuate the air from the upper chamber 43 over the entire travel of the piston 27.

O-Rings 47 are advantageously inserted between the cylinder body 24 and its housing 31 in such a way as to isolate the upper cross-section of the jacket 37 both from the cavity and from the feed pipe.

The cylinder 23 is therefore of the single-action type.

The shaping of a container 2 is carried out in the following manner. The counter-stretching rod 25 is first placed in its deployed position, by injection of pressurized fluid into the lower chamber 42 of the cylinder body 24 via the feed pipe 36. The fluid can be air (the cylinder then being pneumatic) or a liquid (such as oil, the cylinder then being hydraulic). Under the action of the pressure difference between the lower chamber 42 and the upper chamber 43 (which is always at atmospheric pressure), the counter-stretching rod 25 is pushed back by its piston 27 towards its deployed position, until the piston 27 abuts against the upper wall 40.

A preform 3 is then inserted into the mold 1. The bottom 9 of the preform 3 comes into contact with the free end 26 of the counter-stretching rod 25. If necessary, the injection pellet 10 is housed in the reserve 28 that is formed at the free end 26 of the counter-stretching rod 25.

If the container 2 is to be shaped by stretch blow molding, the stretching rod 22 is inserted into the preform 3 until coming into contact with the bottom 9, which is thus found clamped between the stretching rod 22 and the counter-stretching rod 25 (FIG. 1).

Figure 3:
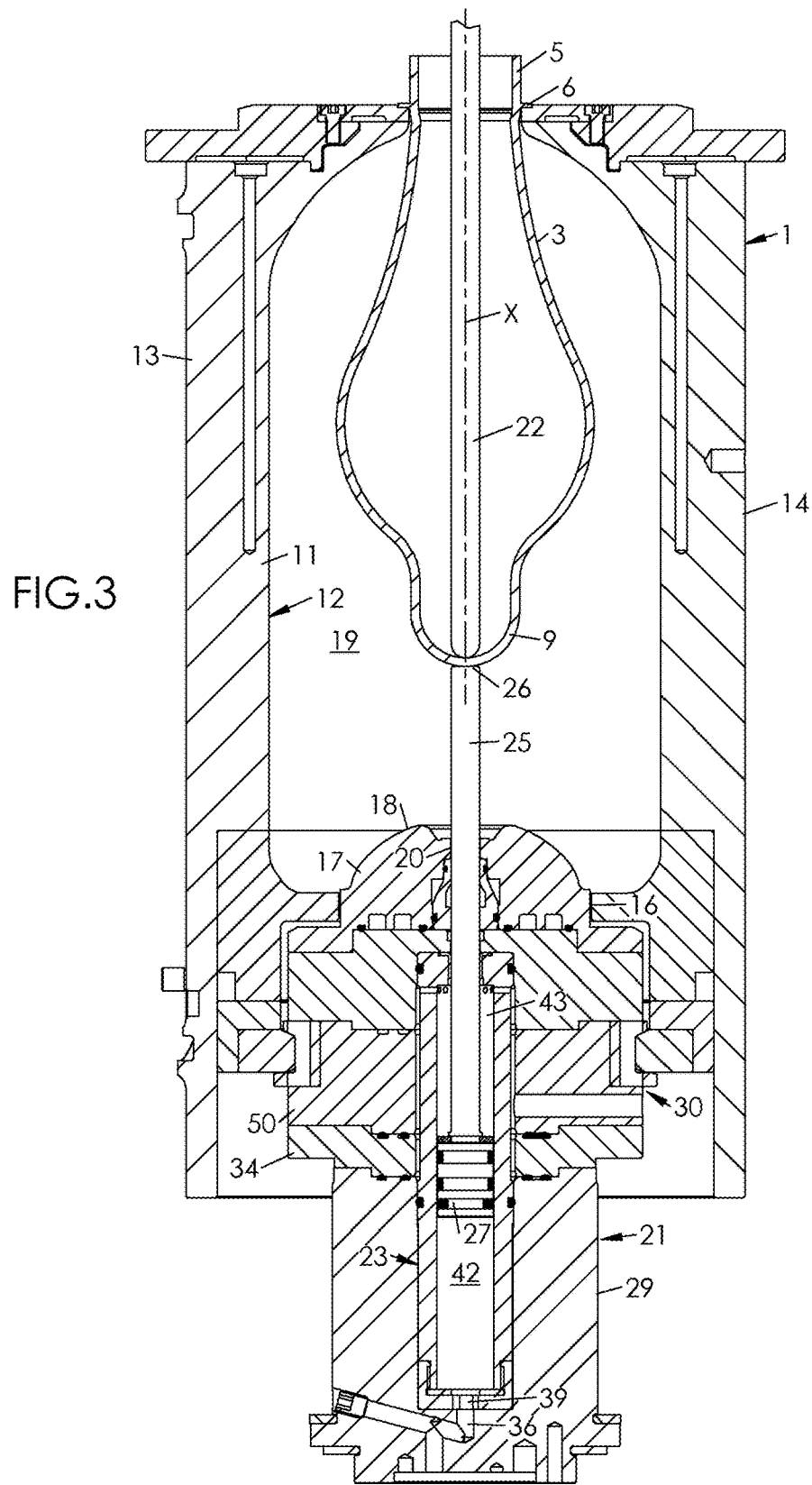
FIG. 3 is a view that is similar to FIG. 1, showing the mold during the shaping of a container from a preform, with the counter-stretching rod being in an intermediate position.

A pressurized fluid (in particular air) is then injected into the preform 3 for the purpose of shaping the container 2, while the stretching rod 22 is deployed axially in the direction of the mold bottom 17. The force exerted by the stretching rod 22 and/or the pressure of the fluid in the preform 3 generate(s) on the bottom 9 of the preform an axial resultant that is greater than the resistant force opposed by the counter-stretching rod 25, which gives way and descends toward its retracted position, without thereby being separated from the bottom 9 of the preform that it thus holds in the axis X of the mold (FIG. 3).

Once the counter-stretching rod 25 has reached its retracted position, the container 2 can be shaped completely by taking on the impression of the cavity 19.

It is easily understood that it is important that the counter-stretching rod 25 be correctly guided. For this purpose, the stand 21 can be equipped with a sleeve 48 that is spaced from the cylinder body 24, provided at its center with a bore that passes through the counter-stretching rod 25. In the example that is illustrated in FIG. 2, the sleeve 48 is housed in the mold bottom 17, perpendicular to the passage 20 that is formed in the former.

In addition, as FIG. 2 clearly shows, the upper stage 30 of the stand 21 can comprise at least two fitted pieces, namely:

A support 49 to which the mold bottom 17 is attached (for example, by screwing), and in which the upper bore 33 ends;

A base 50 to which the support 49 is attached, with this base 50 carrying a centering ring 51 that has a groove 52 into which, in the closed position of the mold 1, jaws 53 are fitted that are mounted on the half-molds 13, 14, on the one hand, to center the mold bottom 17 in relation to the side wall 11 and, on the other hand, to ensure the resumption of axial forces that are exerted on the mold bottom 17 at the end of the shaping of the container 2 because of the pressure that prevails in the former.

This two-part structure of the upper stage 30 makes it possible to detach the ring 51, which is a part that is subject to wear and tear, and to replace it by an identical new ring, as soon as radial (or axial) play of the stand 21 appears in relation to the half-molds 13, 14. The jaws 53 can also be replaced when they are worn out.

As FIG. 2 shows, the hole 39 for exposure to air can be positioned in the base 50.

The invention claimed is:

1. Mold (1) for the manufacturing, starting from a preform (3) that is made of plastic material, of a container (2) that comprises a body (4) and a bottom (7), with this mold (1) comprising:
   A side wall (11) that has an inner surface (12) that defines an at least partial impression of the body (4) of the container (2) and that has a lower opening (16) at a lower end;
   A mold bottom (17) that is fitted into the lower opening (16) and that has an upper surface (18) that defines an at least partial impression of the bottom (7) of the container (2), with the mold bottom (17) being penetrated at its center by a passage (20);
   A cylinder (23) that comprises a cylinder body (24) and a counter-stretching rod (25) that is mounted to slide in relation to the cylinder body (24) through the passage (20), between a deployed position in which a free end (26) of the counter-stretching rod (25) projects in relation to the mold bottom (17) and a retracted position in which the free end (26) of the counter-stretching rod (25) is in the vicinity of the mold bottom (17);
   wherein the mold also comprises a stand (21) on which the mold bottom (17) is mounted, with this stand (21) comprising a lower stage (29) and an upper stage (30) mounted on the lower stage (29), with the stand (21) defining on the inside a housing (31) in which is mounted the cylinder body (24), with the stand (21) also comprising a crosspiece (34) that is inserted in a removable manner between the upper stage (30) and the lower stage (29) and that defines, in part, the housing (31).

2. Mold (1) according to claim 1, wherein the crosspiece (34) is provided with a through hole (35) that forms in part the housing (31).

3. Mold (1) according to claim 1, wherein the lower stage (29) of the stand (21) is provided with a lower bore (32) that forms a part of the housing (31) for the cylinder body (24).

4. Mold (1) according to claim 3, wherein the lower stage (29) of the stand (21) is penetrated by a fluid feed pipe (36), which empties into the lower bore (32).

5. Mold (1) according to claim 1, wherein the upper stage (30) of the stand (21) is provided with an upper bore (33) that forms a part of the housing (31) for the cylinder body (24).

6. Mold (1) according to claim 5, wherein the upper stage (30) is penetrated by a hole (44) for exposure to the air that empties into the upper bore (33).

7. Mold (1) according to claim 5, wherein the cylinder body (24) has a larger cross-section (45) with a smaller diameter than the one of the upper bore (33), with this larger cross-section (45) being penetrated by at least one air vent (46) that empties into the upper bore (33).

8. Mold (1) according to claim 1, where the upper stage (30) of the stand (21) comprises a support (49) on which the mold bottom (17) is mounted, and a base (50) on which the support (49) is mounted.

9. Mold (1) according to claim 8, wherein the base (50) carries a centering ring (51) that has a groove (52) into which jaws (53) are fitted that are integral with the side wall.

10. Mold (1) according to claim 2, wherein the lower stage (29) of the stand (21) is provided with a lower bore (32) that forms a part of the housing (31) for the cylinder body (24).

11. Mold (1) according to claim 2, wherein the upper stage (30) of the stand (21) is provided with an upper bore (33) that forms a part of the housing (31) for the cylinder body (24).

12. Mold (1) according to claim 3, wherein the upper stage (30) of the stand (21) is provided with an upper bore (33) that forms a part of the housing (31) for the cylinder body (24).

13. Mold (1) according to claim 4, wherein the upper stage (30) of the stand (21) is provided with an upper bore (33) that forms a part of the housing (31) for the cylinder body (24).

14. Mold (1) according to claim 6, wherein the cylinder body (24) has a larger cross-section (45) with a smaller diameter than the one of the upper bore (33), with this larger cross-section (45) being penetrated by at least one air vent (46) that empties into the upper bore (33).

15. Mold (1) according to claim 2, wherein the upper stage (30) of the stand (21) comprises a support (49) on which the mold bottom (17) is mounted, and a base (50) on which the support (49) is mounted.

16. Mold (1) according to claim 3, wherein the upper stage (30) of the stand (21) comprises a support (49) on which the mold bottom (17) is mounted, and a base (50) on which the support (49) is mounted.

17. Mold (1) according to claim 4, wherein the upper stage (30) of the stand (21) comprises a support (49) on which the mold bottom (17) is mounted, and a base (50) on which the support (49) is mounted.

18. Mold (1) according to claim 5, wherein the upper stage (30) of the stand (21) comprises a support (49) on which the mold bottom (17) is mounted, and a base (50) on which the support (49) is mounted.

19. Mold (1) according to claim 6, wherein the upper stage (30) of the stand (21) comprises a support (49) on which the mold bottom (17) is mounted, and a base (50) on which the support (49) is mounted.

20. Mold (1) according to claim 7, wherein the upper stage (30) of the stand (21) comprises a support (49) on which the mold bottom (17) is mounted, and a base (50) on which the support (49) is mounted.

\* \* \* \* \*